Figure 1:
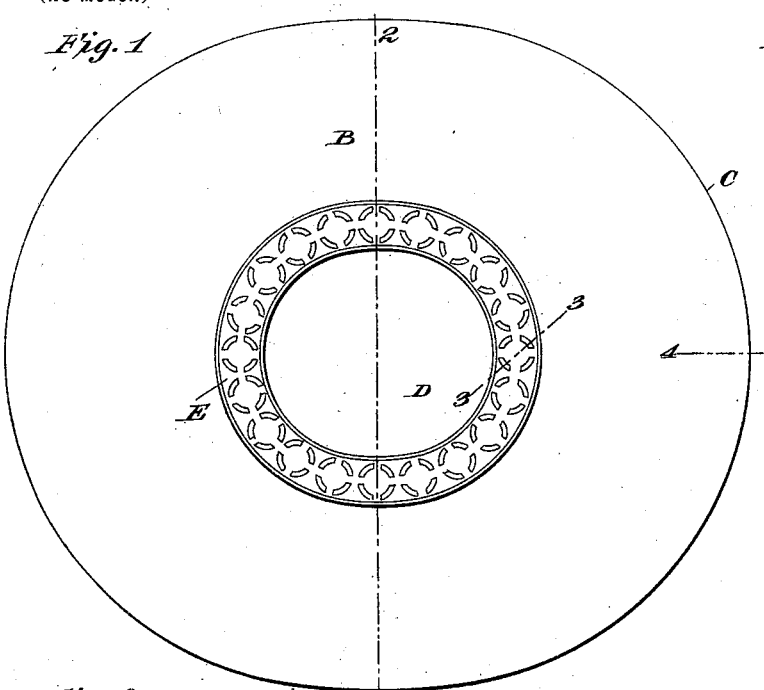

No. 637,136. Patented Nov. 14, 1899.
H. LEMMERMANN.
BATHING CAP OR OTHER RUBBER ARTICLE AND PROCESS OF MAKING SAME.
(Application filed Mar. 10, 1899.)
(No Model.)

Witnesses: Inventor
Henry Lemmermann
Att'ys.

UNITED STATES PATENT OFFICE.

HENRY LEMMERMANN, OF HASBROUCK HEIGHTS, NEW JERSEY.

BATHING-CAP OR OTHER RUBBER ARTICLE AND PROCESS OF MAKING SAME.

SPECIFICATION forming part of Letters Patent No. 637,136, dated November 14, 1899.

Application filed March 10, 1899. Serial No. 708,583. (No specimens.)

*To all whom it may concern:*

Be it known that I, HENRY LEMMERMANN, a citizen of the United States, residing at Hasbrouck Heights, in the county of Bergen and State of New Jersey, have invented a certain new and useful Improvement in Bathing-Caps or other Rubber Articles and Process of Making the Same, of which the following is a specification.

My invention relates to new and useful improvements in rubber bathing-caps and other rubber articles and process of making the same. Bathing-caps as now generally made are composed of two rubber sheets or disks united at the edges, one of them having a head-opening therein, while with another well-known type of such caps two sheets are united at the sides to form a pouch-like or bag-like head-covering.

It has heretofore been the practice in the manufacture of rubber bathing-caps and similar articles to cut out the sections of the article from uncured rubber sheets, the action of the cutting-die serving to temporarily unite the edges of the sheets together, after which the seams so formed between the sheets are generally bound by sewing a braid or tape over the same. This makes a clumsy, expensive, and leaky seam, which it is one of the objects of my invention to perfect. To this end I make a bathing-cap or any rubber article having a seam by employing a combined cutting and compressing die. The die is provided with a cutting edge which severs the two sheets in the desired configuration and serves to bind together the extreme outer edges thereof, and it is further provided with an embossing shoulder or ledge, located immediately within the cutting edge and by which the two uncured sheets will be firmly compressed together and permanently united along the line of compression. When the articles are properly vulcanized or finally treated by any of the usual processes, the seam thus produced will be rendered absolutely permanent, while at the same time the extreme outer edges will remain engaged together, as they will be relieved of strains. Not only is the seam which I produce of great permanency, but it materially adds to the appearance of the completed articles.

With bathing-caps or with other rubber articles having interiors reached through openings or mouths formed in the articles it is generally the practice to reinforce the opening or mouth with a rubber reinforcement, either a separate strip or one formed by overturning the edges of the sheet or sheets from which the article is produced. Heretofore these reinforcing-strips have been applied or secured, as the case may be, by the use of a rubber solvent, such as benzin, which is applied to the strip or to the overturned edge, after which the double thickness of rubber thus formed is subjected to a pounding operation to remove air-bubbles and to cause the two rubber thicknesses to adhere closely together. A strip so applied is objectionable, as the use of a solvent tends to rot the rubber to a certain extent, besides which a certain feeling of clamminess is inherent in the finished article. Furthermore, the cost of manufacture is relatively high.

The second object of my invention is the improvement in these reinforcing-strips or overturned portions of rubber articles adjacent to the mouths or openings thereof. To effect this object, I apply a reinforcing-strip or secure the overturned portion of the rubber sheet by means of compression-dies operating on the sheets in the uncured state and serving to compress the reinforcing-strip or overturned portion into place within relatively-restricted areas, so that a firm union will be secured when the sheets are vulcanized or cured. The dies by which the compression is effected to this end are preferably arranged in suitable conventional designs, so that when the reinforcing-strips are applied or the overturned portions are secured as I describe the effect will be given to the eye of highly-ornamental embossing. This effect will be increased if the reinforcing-strips, when used, are made of rubber of different color.

In order that my invention may be better understood, attention is directed to the accompanying drawings, forming a part of this specification, and in which—

Figure 2:
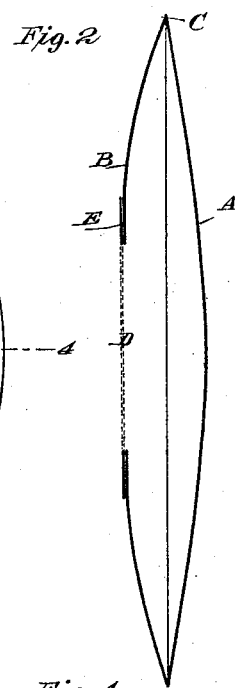

Figure 1 is an ordinary form of bathing-cap, showing the joint between the two sheets formed and the reinforcing-strip applied in accordance with my present invention; Fig. 2, a cross-section through the line 2 2 of Fig.

Figure 3:
Figure 4:
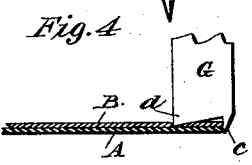
Figure 5:
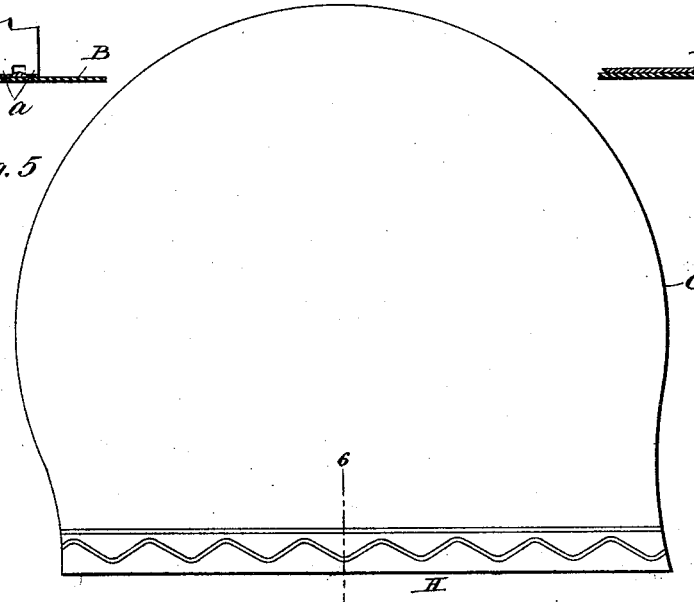

1, illustrating in dotted lines a step in the manufacture and showing for the purpose of clearness the two sheets separated slightly at their centers, it being remarked that in practice the two sheets will normally be substantially parallel; Fig. 3, a section on the line 3 3 of Fig. 1, on a very much enlarged scale, showing the dies for applying the reinforcing-strip in place; Fig. 4, a section on the line 4 4 of Fig. 1, on a very much enlarged scale, showing the die for forming the seam between the rubber sheets; Fig. 5, a side view of another form of bathing-cap used particularly by men in diving, showing my present improvement applied thereto; and Fig. 6, a section on the line 6 6 of Fig. 5, on a very much enlarged scale, illustrating the dies for securing the overturned bottom edge of the cap.

In all the above views corresponding parts are represented by the same letters of reference.

The bathing or diving caps which are shown in Figs. 1 and 5 will be recognized as of common types. I make no claim to the form or general construction of these caps, neither do I wish to be limited to these or similar articles, since my present improvements can be applied to the manufacture of any rubber articles where the two sheets are to be united together with a neat, cheap, and permanent seam or where a mouth or opening in a rubber sheet or formed between two rubber sheets is required to be reinforced either by means of a separate reinforcing-strip or by turning over the edge of the sheet or sheets.

In Fig. 1 the cap is made of a top disk A and a bottom disk B, generally elliptical in form and united at the edge C. The bottom sheet B is provided with a head-opening D therein, around which there is a reinforcing-strip E. In making these caps I prefer to apply the reinforcing-strip to the sheet B before the two sheets are placed together, although this process need not be followed at all times. The reinforcing-strip E is preferably cut from a disk of rubber after it has been applied to the sheet, as I show in dotted lines in Fig. 2—that is to say, I first take the sheet B and place on its center the disk, the periphery of which determines the outer edge of the ultimate reinforcing-strip E. This is shown also in Fig. 3. I now use an embossing or compressing die F, having a compression surface or surfaces $a$ in relief and preferably formed to represent a suitable conventional design. The disk E being placed upon the sheet D, the embossing-die F is brought down and compresses the uncured rubber, comprising both the sheet and disk, along the lines of the compression-surface $a$. By thus effecting compression along limited areas the two rubber sections will, after vulcanization or other curing operation, be permanently secured together. This would not be possible if compression were applied throughout the entire area of the reinforcing-strip. A cutting-die (not shown) is now used to cut through both the disk and sheet to form the head-opening. Having obtained the sheet B with the reinforcing-strip applied in place around the head-opening the sheets A and B are now placed together and an embossing and cutting die G is employed to cut out the form of the cap and to seam the two sheets together. This die is provided with a cutting edge $c$, extending entirely around to form the shape of the cap, and with a compression shoulder or ledge $d$, extending around the die immediately inside of the cutting edge $c$. It will of course be understood that each of the dies F and G is annular, the former securing the reinforcing-strip in place at one stroke and the latter cutting the entire outside edge C of the cap at one operation also. The die G in thus being applied compresses the uncured sheets of rubber together along the limited area defined by the compression-ledge $d$, so that when the article is finally cured or vulcanized a permanent joint will be secured thereat. Also the cutting edge $c$ tends to compress the extreme outer edges of the sheets together, forming a joint thereat of sufficient permanence for all purposes, since it is not subjected to strains.

Figure 6:
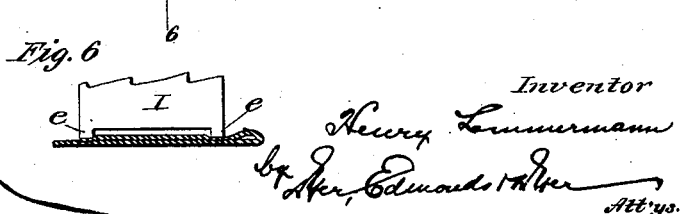

The cap shown in Fig. 5 is of less common form, but is still largely used in this country. It comprises two sheets secured together at the edge C and having an open bottom H, the whole constituting a tightly-fitting pouch or pocket like head-covering. The seam C is formed by a cutting and compressing die similar to G, except that instead of being annular it will be substantially horseshoe or U shaped. Before the two sheets forming this cap are applied together the bottom edge of each is turned over, as shown in Fig. 6, and a simple embossing-die I, having a compression surface or ledge $e$, is used to compress the uncured rubber within a restricted area, so that when the sheet is cured the overturned bottom edge of the cap will be firmly and permanently "set." As shown, the limited area in which the embossing-die I is arranged to work is formed into approximate corrugations or waves, although any other ornamentation may be followed.

Having now described my invention, what I claim as new, and desire to secure by Letters Patent, is as follows:

1. As a new article of manufacture, a rubber article formed of two sheets having a seam produced within the edges of the sheets, at which seam the sheets are of less thickness than at other portions, substantially as set forth.

2. As a new article of manufacture, a rubber article formed of two sheets having a seam produced within the edges of the sheets, at which seam the sheets are of less thickness than at other portions, and a supplemental seam at the extreme outer edges of the sheets, substantially as set forth.

3. As a new article of manufacture, a rubber article composed of two rubber sheets secured together at their edges by a seam located within the edges of the sheets and in line with which seam the material is of less thickness than at other portions, substantially as set forth.

4. As a new article of manufacture, a rubber article composed of two rubber sheets secured together at their edges by a seam located within the edges of the sheets and in line with which seam the material is of less thickness than at other portions, and a supplemental seam at the extreme edges of the sheets, substantially as set forth.

5. As a new article of manufacture, a rubber article, having an opening or mouth, the rubber being of double thickness surrounding said opening or mouth, the two thicknesses being secured together in areas corresponding to which the material is of less thickness than at other portions, the reduced areas so produced being of ornamental form, substantially as set forth.

6. As a new article of manufacture, a rubber article composed of two disks secured together at their edges, a head-opening formed in one of said disks, and a reinforcing-strip around said head-opening secured in place within limited areas corresponding to which the material is of less thickness than at other portions, substantially as set forth.

7. As a new article of manufacture, a rubber article composed of two disks secured together at their edges, a head-opening formed in one of said disks, and a reinforcing-strip around said head-opening secured in place within limited areas corresponding to which the material is of less thickness than at other portions, the limited areas being arranged in ornamental form, substantially as set forth.

8. As a new article of manufacture, a rubber article composed of two disks secured together at their edges, a head-opening formed in one of said disks, and a reinforcing-strip of a contrasting color around said head-opening secured in place within limited areas corresponding to which the material is of less thickness than at other portions, substantially as set forth.

9. The process of producing a seam between two sheets of uncured rubber, which consists in simultaneously cutting the rubber in a desired configuration and in effecting compression upon the two sheets on a line extending substantially parallel with the cut, whereby at the cut a temporary seam will be formed and at the compression a permanent seam will be produced after vulcanization, substantially as set forth.

10. The process of securing two rubber sections together, which consists in applying pressure to the sections in limited areas and then vulcanizing them, substantially as set forth.

11. The process of securing two rubber sections together, which consists in applying pressure to the sections in limited but ornamental areas, and then vulcanizing them, substantially as set forth.

12. The process of making rubber articles comprising two disks, one of which has a head-opening, said process consisting in applying a reinforcing-strip to one disk, in cutting out a head-opening therein, and in then seaming the edges of the two rubber disks, substantially as set forth.

13. The process of making rubber articles, which consists in applying an uncured-rubber disk to an uncured-rubber sheet, in effecting compression in limited areas of the disk and sheet, in cutting a head-opening through the disk and sheet, in placing the said sheet having the head-opening formed therein upon a second sheet, in cutting a cap out of the two sheets, and in seaming the edges together, substantially as set forth.

14. The process of making rubber articles, which consists in applying an uncured-rubber disk to an uncured-rubber sheet, in effecting compression in limited areas of the disk and sheet, in cutting a head-opening through the disk and sheet, in placing the said sheet having the head-opening formed therein upon a second sheet, in simultaneously cutting a cap out of the two sheets and seaming the edges together by compression, substantially as set forth.

15. As a new article of manufacture, a rubber article having an opening or mouth, the rubber being of double thickness surrounding said opening or mouth, the two thicknesses being secured together in areas corresponding to which the material is of less thickness than at other portions, substantially as set forth.

This specification signed and witnessed this 1st day of March, 1899.

HENRY LEMMERMANN.

Witnesses:
 JOHN BEHRENS,
 JAMES J. GANEY.